United States Patent
Pasera et al.

(10) Patent No.: US 8,551,665 B2
(45) Date of Patent: Oct. 8, 2013

(54) SUPPLY SYSTEM AND WARNING DEVICE FOR A FUEL CELL STACK AND METHOD FOR CONTROLLING THE SUPPLY SYSTEM

(75) Inventors: Uwe Pasera, Esslingen (DE); Simon Steinhubl, Holzmaden (DE)

(73) Assignee: Daimler AG, Stuttgart (DE)

( * ) Notice: Subject to any disclaimer, the term of this patent is extended or adjusted under 35 U.S.C. 154(b) by 992 days.

(21) Appl. No.: 12/526,441

(22) PCT Filed: Feb. 9, 2007

(86) PCT No.: PCT/EP2007/001102
§ 371 (c)(1),
(2), (4) Date: Nov. 20, 2009

(87) PCT Pub. No.: WO2008/095512
PCT Pub. Date: Aug. 14, 2008

(65) Prior Publication Data
US 2010/0086812 A1    Apr. 8, 2010

(51) Int. Cl.
*H01M 8/06* (2006.01)
(52) U.S. Cl.
USPC ............ 429/413; 429/408; 429/414; 429/427
(58) Field of Classification Search
USPC .................................. 429/408, 413, 414, 427
See application file for complete search history.

(56) References Cited

U.S. PATENT DOCUMENTS

| | | | |
|---|---|---|---|
| 6,103,409 A * | 8/2000 | DiPierno Bosco et al. ... | 429/446 |
| 6,428,915 B1 | 8/2002 | Ban et al. | |
| 6,562,501 B1 | 5/2003 | Nagamiya et al. | |
| 6,635,374 B1 | 10/2003 | Aramaki | |
| 6,884,534 B2 | 4/2005 | Wheat et al. | |
| 7,455,721 B2 | 11/2008 | Berger et al. | |
| 8,399,142 B2 * | 3/2013 | Fagley et al. ................. | 429/433 |
| 2002/0106537 A1 * | 8/2002 | Saito ............................... | 429/13 |
| 2002/0164509 A1 * | 11/2002 | Wheat et al. .................... | 429/22 |
| 2002/0177017 A1 * | 11/2002 | Nelson et al. ................... | 429/22 |

(Continued)

FOREIGN PATENT DOCUMENTS

| | | |
|---|---|---|
| CN | 85 2 04022 U | 10/1986 |
| DE | 199 45 323 B4 | 4/2000 |

(Continued)

OTHER PUBLICATIONS

English translation of ISA opinion Feb. 9, 2007.*

(Continued)

*Primary Examiner* — Mark A Osele
*Assistant Examiner* — Nickolas Harm
(74) *Attorney, Agent, or Firm* — Crowell & Moring LLP

(57) ABSTRACT

In a fuel cell stack, fuel, such as often hydrogen, electrochemically reacts with an oxidant, such as ambient air, and electric energy is generated from chemical energy. During the reaction, a proton exchange membrane (PEM) separates the fuel from the oxidant during the electrochemical process. A supply system for the fuel cell stack comprises an adjustable humidifying device for humidifying a supply gas which is supplied to the fuel cell stack, as a function of a control signal; and a dehumidifying device, which is configured to dehumidify an exhaust gas that is formed from the supply gas conducted through the fuel cell stack, and to discharge the same as a dehumidified exhaust gas. A controller, which generates the control signal, is configured from a programming and/or switching point of view to generate the control signal based on the gas temperature of the dehumidified exhaust gas.

7 Claims, 2 Drawing Sheets

(56) References Cited

U.S. PATENT DOCUMENTS

| | | | |
|---|---|---|---|
| 2004/0185315 A1* | 9/2004 | Enjoji et al. | 429/22 |
| 2005/0221134 A1 | 10/2005 | Liu et al. | |
| 2006/0029837 A1 | 2/2006 | Sennoun et al. | |
| 2006/0134472 A1* | 6/2006 | Bach et al. | 429/13 |
| 2006/0147773 A1 | 7/2006 | Steinshnider et al. | |
| 2006/0154124 A1* | 7/2006 | Fowler et al. | 429/22 |
| 2006/0251943 A1* | 11/2006 | Hatoh et al. | 429/32 |
| 2009/0239111 A1* | 9/2009 | Zeng | 429/26 |
| 2010/0255390 A1* | 10/2010 | Tanaka et al. | 429/413 |

FOREIGN PATENT DOCUMENTS

| | | |
|---|---|---|
| DE | 100 21 946 B4 | 7/2001 |
| DE | 100 57 804 A1 | 8/2001 |
| DE | 102 19 626 A1 | 11/2002 |
| DE | 102 27 272 A1 | 1/2004 |
| JP | 5047394 A | 2/1993 |
| JP | 10064569 A | 3/1998 |
| JP | 2000-164231 A | 6/2000 |
| JP | 2000-306595 A | 11/2000 |
| JP | 2002-289232 A | 10/2002 |
| JP | 2004-355843 A | 12/2004 |
| JP | 2005-85723 A | 3/2005 |
| JP | 2005-149897 A | 6/2005 |
| JP | 2005-340006 A | 12/2005 |
| JP | 2005-158354 A | 6/2006 |
| JP | 2006-156203 A | 6/2006 |
| JP | 2006-286411 A | 10/2006 |
| JP | 2007-5064 A | 1/2007 |
| WO | WO 02/23660 A2 | 3/2002 |
| WO | WO 2004/017450 A2 | 2/2004 |

OTHER PUBLICATIONS

Form PCT/ISA/237 w/English translation of Written Opinion (nine (9) pages), dated Feb. 9, 2007.
International Search Report dated Oct. 4, 2007 w/English translation (six (6) pages).
Chinese Office Action dated Jun. 6, 2012 (four (4) pages).
Japanese Office Action date Jul. 11, 2012 (four (4) pages).
Japanese Office Action with English translation dated Jul. 11, 2012 (eight (8) pages).

* cited by examiner

SUPPLY SYSTEM AND WARNING DEVICE FOR A FUEL CELL STACK AND METHOD FOR CONTROLLING THE SUPPLY SYSTEM

This application is a national stage of PCT International Application No. PCT/EP2007/001102, filed Feb. 9, 2007, the entire disclosure of which is herein expressly incorporated by reference.

BACKGROUND AND SUMMARY OF THE INVENTION

The invention relates to a supply system for a fuel cell stack with an adjustable humidifying device for humidifying a gas that is supplied to the fuel cell stack in response to a control signal, a dehumidifying device for dehumidifying and discharging exhaust gas formed from the supply gas after it has been conducted through the fuel cell stack, a controller for generating the control signal, and a warning device. The invention also provides a method for controlling such a supply system.

Fuel cell stacks provide a possible alternative for the mobile energy supply for motor vehicles in the near future. As is well known, in fuel cell stacks a fuel (often hydrogen) reacts electrochemically with an oxidant (often ambient air) and electric energy is generated or is converted from chemical energy. During the reaction, a membrane (often a proton exchange membrane, or "PEM") which separates the fuel from the oxidant during the electrochemical process, plays a key role, for which purpose, it must be kept humid within defined limits during the operation of the fuel cell stack. Insufficient humidification can lead to drying out and premature wear of the membrane, and excessive humidification can cause a reduction of the performance of the fuel cell stack. The humidification is usually applied to input working gases.

German patent document DE 102 196 26 A1 discloses a fuel cell system, which uses a humidity sensor to control the humidification. The sensor measures humidity of the inflowing working gases, and actuates a control device (an adjustable bypass line with regard to the flow-through humidifier, upstream of the fuel cell stack) for controlling the humidity on the basis of the sensor signals. As an alternative to the humidity sensor, it is also suggested in this document to use a "virtual control" for controlling the humidity, wherein the control device is then actuated based on the performance of the fuel cell stack.

International patent document WO 02/23660 A2 suggests a different method or device for humidifying fuel cells or their membranes, in which a control device (a valve) is controlled based on the temperature of the cooling water fluid of the fuel cells.

Japanese patent document JP 2005149897 A (publication number), possibly the closest prior art, discloses a humidifying system for fuel cells which includes, similarly to the first-mentioned document, a control device in the form of a bypass line around a humidifying device. The control device is actuated by an actuator via a controller and the control signal is generated based on temperature measurements of the gas flowing towards the fuel cell system or of the gas exiting from the fuel cell system in a region in front of a dehumidifier.

One object of the invention is to provide a supply system and a warning device for a fuel cell stack and a method for controlling the supply system, which enables a reliable control of the humidity in the region of the membrane or the membranes of a fuel cell stack in a technically simple manner.

This and other objects and advantages are achieved by the supply system according to the invention, for a fuel cell stack which preferably has a plurality of fuel cells, especially in a PEM configuration (proton exchange membrane). For example, over 100 fuel cells are assembled to a stack.

The supply system has an adjustable humidifying device as an actuator, which is formed and/or configured to humidify a supply gas for the fuel cell stack, based on a control signal. The supply gas may be either cathode or anode gas, for example ambient air or fuel (hydrogen). The fuel may be supplied, without a reformer, from a tank which can be refueled.

The humidifying device increases the relative humidity of the supply gas. (Relative humidity is preferably defined as the percentage ratio between the momentary water vapor pressure and the saturated water vapor pressure.) The supply gas is especially completely saturated with water vapor with a relative humidity of 100%. The excess humidity often deposits as condensate or mist when 100% is exceeded. The increase of the relative humidity is adjusted based on the control signal, so that the actuator accessed by the control signal gives the amount of the relative humidity of the supply gas.

In addition, a dehumidifying device, which is integrated into the supply system, dehumidifies exhaust gas (used or partially used supply gas) from the fuel cell stack, so that a dehumidified exhaust gas is formed. Recyclable fluid, especially water, is withdrawn from the exhaust gas by the dehumidifying device, and can be returned to the supply system in a cycle, and thereby the fuel cell stack.

Finally, a controller is provided for generating the control signal which may be either electric (especially, digital), or mechanical.

According to the invention, the controller may be formed from a programming or switching point of view, to generate the control signal based on the gas temperature of the dehumidified exhaust gas. The controller preferably comprises a processor unit, as for example micro controller, DSP, ASIC or the like. For measuring the gas temperature of the dehumidified exhaust gas, a temperature sensor is preferably integrated in the supply system, directly at and/or near the outlet of the dehumidifying device, or is integrated in the humidifying device to avoid or minimize measuring errors.

In a practical implementation of the invention, the control signal is generated on the basis of the temperature difference between the exhaust gas and the dehumidified exhaust gas. For determining the temperature difference, a temperature difference sensor or two separate temperature sensors can for example be used. Instead of the temperature of the exhaust gas, a temperature can also be measured at another measuring point, as long as this is in a sufficiently predictable connection with the temperature of the exhaust gas. In other words, relative measurements for the temperature of the exhaust gas are also within the scope of the invention.

The invention has the advantage of providing a control (especially a regulation or control of the humidity at the fuel cell inlet or -outlet, and thus also at the membranes of the fuel cells) with an acceptable cost and space requirement.

The invention operates on the assumption that the relative humidity of the exhaust gas of the dehumidifying device decreases over the path of the dehumidifying device by the withdrawal of humidity from the exhaust gas, so that the exhaust gas is again enabled to take up liquid water by means of a renewed evaporation. However, this evaporation requires energy which is withdrawn from the exhaust gas, which leads to a cooling of the exhaust gas. The resulting temperature difference between the dehumidifying device inlet and the dehumidifying device outlet or between exhaust gas and dehumidified exhaust gas is proof that liquid water was present and was evaporated. The temperature difference is thereby higher, the more water is evaporated (that is, the more humid the exhaust gas from the fuel cell stack). When implementing the deliberation, it is possible to determine the outlet humidity of the exhaust gas from the fuel cell stack on the basis of the temperature of the dehumidified exhaust gas or on the basis of the temperature difference between exhaust gas and dehumidified exhaust gas sufficiently accurately. With knowledge of the fuel cell stack outlet humidity and further operating parameters, the inlet humidity of the supply gas at the fuel cell stack can then be estimated or determined. The temperature (or temperature difference) measurement thus forms a relative measurement for the inlet humidity of the supply gas at the fuel cell stack, so that it is possible to generate a control signal through the controller, which influences the humidifying device in such a manner that desired humidity conditions are adjusted for the fuel cell stack.

Further advantages compared to the known state of the art result in that tolerances caused by production of the fuel cell stack or the humidifying device can be considered by the controller or by a calibration of the controller, as the supply system provides a feedback regarding the actual operating state of the fuel cell stack.

In other words, the relative humidity of the exhaust gas coming from the fuel cell stack can be determined sufficiently accurately in a certain region via the connection of the gas humidity at the fuel cell stack outlet with the temperature difference between the fuel cell stack outlet and the dehumidifying device outlet. The supply system thereby also permits adjustment of the fuel cell stack inlet humidity with the help of the actuator of the adjustable humidifying device, in such a manner that the desired humidity level is adjusted at the fuel cell stack outlet and inlet.

In a preferred embodiment, a regulation or control of several magnitudes is implemented in the controller. Thus, the control signal is and/or can be generated using further input parameters, as for example fuel cell stack temperature, pressure, released fuel cell stack current and/or air stoichiometry, and/or further actuators as e.g. the cooling water temperature of the fuel cell stack, the system pressure and/or the air stoichiometry can be adjusted. With knowledge of the optional further inlet magnitudes it is for example possible to determine the connection between relative humidity at the fuel cell stack outlet and inlet more accurately.

In a preferred further embodiment of the invention, the humidifying device and the dehumidifying device are formed as a gas-to-gas humidifier, which especially has a passive functionality. An especially compact design of the supply system is achieved by this preferred further embodiment, and the fluid withdrawn from the exhaust gas is added sparingly to the supply gas as operating matter. The gas-to-gas humidifier has for example a humid region and a dry region, which are separated by a membrane, through which the liquid can diffuse. The dehumidifying device is especially formed in such a manner that liquid water is present in the humid region during operation, which can be absorbed again by the partially dehumidified gas.

The actuator of the humidifying device is formed as a bypass line with an adjustable valve device; preferably, the bypass line passes around the humidifying device. This embodiment considers that the humidifying or dehumidifying device or the gas-to-gas humidifier is optionally configured to the full load of the fuel cell stack, so that the air humidity of the fuel cell stack inlet is too high when partially loaded and is decreased with the help of the bypass line whose through-flow is controlled via the valve device. The valve device is thereby preferably formed as a throttling device.

In a preferred embodiment, the supply system is characterized by a working region for the relative humidity of the exhaust gas between 80% and 100%. On the one hand, this working region is preferable for a gentle operation of the membrane of the fuel cell stack, and on the other hand, the temperature measurements in this working region are especially significant.

In a robust implementation, a regulation circuit is provided for generating the control signal, wherein the variable is based on the gas temperature of the dehumidified exhaust gas and/or the temperature difference between exhaust gas and dehumidified exhaust gas or formed as this.

A next object of the invention is to provide a method for controlling the previously described supply system, wherein in a first operating mode a cooling water temperature for cooling the fuel cell stack in a load-dependent manner (that is, based on the generated current and/or the generated energy) is adjusted; and the control signal is controlled based on the temperature difference between the exhaust gas and dehumidified exhaust gas. In this first operating mode, the cooling water temperature is for example adjusted via definite grids or look-up tables based on the load, and the humidity at the fuel cell inlet is controlled or regulated with the actuator by means of the temperature difference. Thereby, the humidity in the fuel cell stack can be determined and controlled with the help of further operating conditions, as for example fuel cell stack current, air stoichiometry, cooling water temperature, pressure and the inlet temperature of the supply gas. The air stoichiometry characterizes the relation of the air amount supplied to the fuel cell to the air amount necessary for the combustion. The air mass flow can generally also be used as an operating parameter instead of the air stoichiometry. It is a special advantage of this first operating mode that the cooling water inlet temperature can be adjusted relatively quickly by means of a grid, and the humidity is only controlled by the actuator.

In an addition to the first operating mode, the system pressure (gas pressure) in the fuel stack is decreased as much as possible. The adjustment of the humidity takes place by means of the actuator, so that the highest possible system efficiency can be achieved with a desired humidity. Additional advantages of this modification can be seen in that the low system pressure also effects a low acoustic emission, and the supply system can be regulated dynamically, in a simple manner.

In a second possible operating mode, the cooling water temperature and the control signal are adjusted or regulated based on the temperature of the dehumidified exhaust gas and/or the temperature difference between exhaust gas and dehumidified exhaust gas. With this second operating mode, a desired humidity profile can be adjusted in the fuel cell stack, for example as in winter operation, with regard to the inlet and outlet humidity with a cooling water temperature as low as possible, which is positive for the durability of the individual fuel cells.

With further modifications of the second operating mode, the system pressure and/or the air stoichiometry are also adjusted, regulated and/or controlled dependent on the temperature of the dehumidified gas, and/or the temperature difference between exhaust gas and dehumidified gas. With this modification, advantages regarding a cooling water temperature as low as possible and thus prolonged fuel cell durability, a high system efficiency due to the low system pressure, and a low acoustic emission can be seen as advantages.

Summing up, the invention provides a system for the control, especially control or regulation of the humidity at the fuel cell stack inlet and/or outlet based on the temperature or the temperature difference between fuel cell stack outlet and dehumidifying device outlet. By connecting the air humidity at the fuel cell stack outlet with the temperature difference between the fuel cell stack outlet and dehumidifying device outlet, the humidity content of the exhaust gases coming from the fuel cell stack can be determined approximately in a certain working region. The fuel cell stack inlet humidity can be changed with the help of the actuator in such a manner that the desired humidity level adjusts itself at the fuel cell stack outlet and thereby inlet. The fuel cell stack outlet humidity is in direct connection with the inlet humidity, when the operating conditions such as temperature, pressure, fuel cell stack current and air stoichiometry are known. This control principle enables it to adjust different humidity levels in the fuel cell stack in the long run, as can for example be necessary to adjust for summer or winter operation (which differ regarding desired humidity levels at the outlet of the dry side of the humidifying device.) By sensing the temperature difference, a feedback is obtained in the vehicle during the operation of the fuel cell stack regarding the humidity state of the fuel cell stack and—if necessary—immediate measures or adjustments can be initiated. The operation of the fuel cell stack will thereby become more stable in the normal state, especially, fewer performance-reduced fuel cells occur, and a reaction can take place immediately in the case of a fault, which will be beneficial for the durability of the fuel cell. With an optional addition by a system pressure regulation, positive effects on the system efficiency can also be expected. The described measuring principle can thereby be realized in a relative cost-effective manner.

A next object of the invention which is based on the same inventive idea, is a warning device for a supply system for a fuel cell stack, with a dehumidifying device for dehumidifying exhaust gases exiting from the fuel cell stack to convert them to dehumidified exhaust gases, and with a or the controller for generating a control signal. According to the invention, the control signal is generated based on the temperature difference between the exhaust gas and the dehumidified exhaust gas. The warning device especially optionally has an arbitrary choice of the characteristics of the supply system described previously with regard to the measuring and evaluating principle.

Other objects, advantages and novel features of the present invention will become apparent from the following detailed description of the invention when considered in conjunction with the accompanying drawings.

DETAILED DESCRIPTION OF THE DRAWINGS

Figure 1:
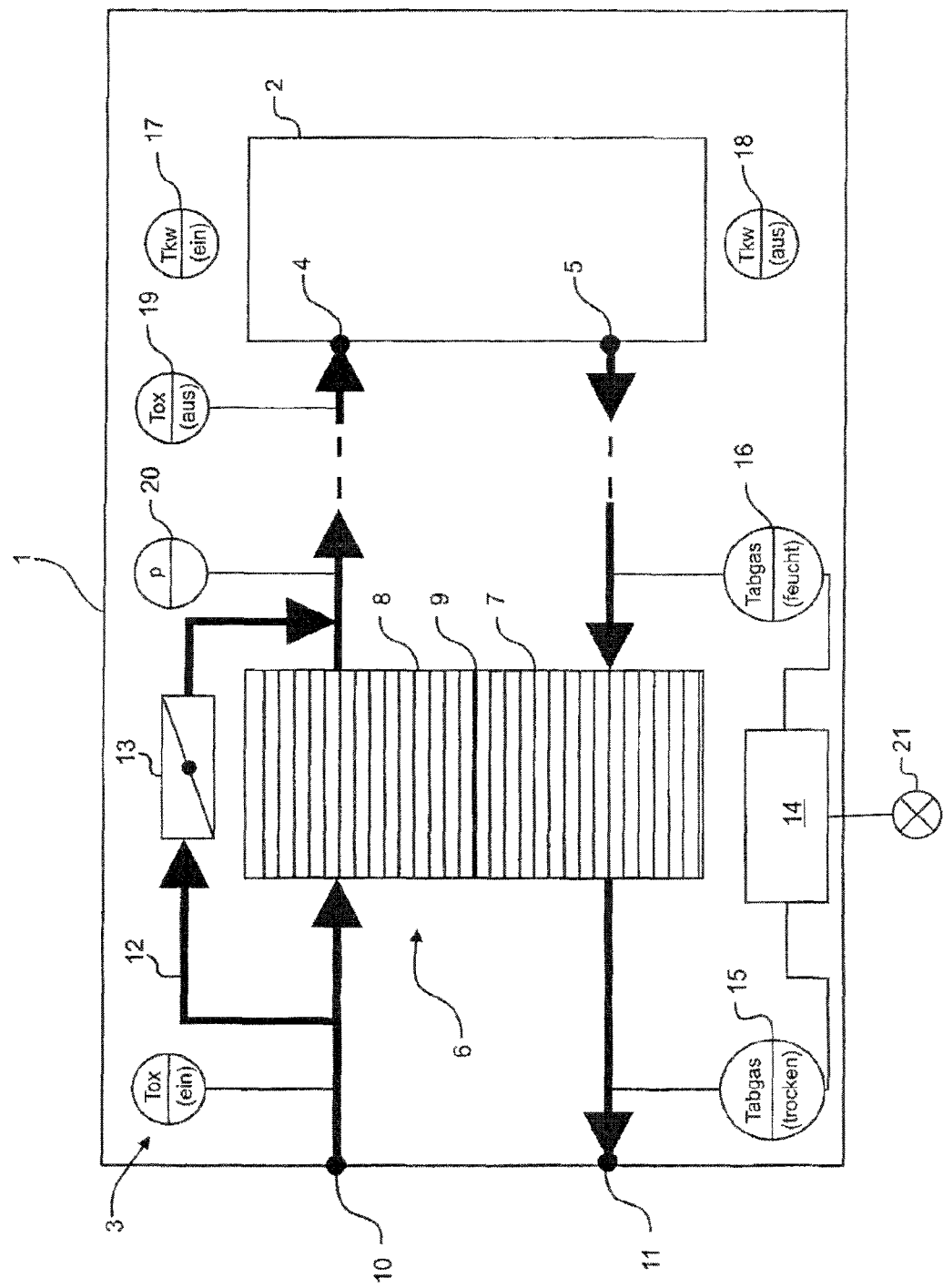
FIG. 1 is a schematic depiction of a fuel cell device with a supply system, as an embodiment of the invention.

FIG. 1 shows a fuel cell device 1 which can, for example, be used as a mobile energy source in a vehicle, especially a motor vehicle. The fuel cell device 1 is shown only schematically in parts and has a fuel cell stack 2, as well as a schematically shown supply system 3 for supplying the fuel cell stack 2 with working gases. In FIG. 1, the cathode side of the fuel cell stack 2 (FIG. 1) is supplied by the gas supply system 3. In alternative embodiments, the anode side of the fuel cell stack 2 can also be supplied by such a gas supply system 3, however, correspondingly adjusted.

The gas supply system 3 is coupled to the fuel cell stack 2 with a gas inlet 4 and a gas outlet 5 in a flow-technological manner, so that a supply gas can flow through the gas inlet 4 and then through the fuel cell stack 2 and leave the fuel cell stack 2 through the gas outlet 5 as exhaust gas. For conditioning the supply gas or the exhaust gas, the gas supply system 3 has a humidifying device 6, which includes a dehumidifying section 7 for dehumidifying the exhaust gases, and a humidifying section 8 for humidifying the supply gases. The dehumidifying and humidifying sections 7, 8 are separated from one another by a membrane 9. The humidifying device 6 is for example formed as a passive gas-to-gas humidifier.

The gas flow progression in the gas supply system 3 starts at an inlet 10, via which an oxidant (especially, ambient air) is supplied, and is conducted to the humidifying section 8. The oxidant is humidified with water in the humidifying section 8, so that its relative humidity is increased, and is then conducted as supply gas to the gas inlet 4. After passing through the fuel cell stack 2, the supply gas, which has now changed to exhaust gas, exits through the gas outlet 5 and is conducted to the dehumidifying section 7 of the humidifying device 6, where the exhaust gas is dehumidified, so that a dehumidified exhaust gas is generated. The dehumidified exhaust gas is finally conducted to an outlet interface 11 and is for example discharged to the environment. The fluid (water) withdrawn from the exhaust gas is conducted into the humidification section 8 via the membrane 9 for humidifying the supply gas.

The gas supply system 3 has a bypass line 12 with a throttling device 13 for adjusting its flow, in order to adjust the relative humidity of the supply gas. The combination of the bypass line 12 and the throttling device 13 thus forms an actuator for adjusting the humidity content of the supply gas. This actuator is sensible, as the humidifying device 6 is usually designed for the maximum flow of supply gas and would introduce too much humidity into the supply gas especially with a partial load of the fuel cell stack 2. Part of the supply gas is passed around the humidifying device 6 by means of the bypass line 12, so that only the remaining part is humidified and afterwards mixed again with the dry part of the supply gas, wherein a partially humidified supply gas is formed as a result.

A controller 14 is provided for activating the adjustable throttling device 13, which is configured to receive as inlet signals a measuring signal from a first temperature sensor 15, (configured for the measurement of the temperature of the dehumidified exhaust gas $T_{Exhaust\,gas}$ (dry) at the outlet of the humidifying device 6), and from a second temperature sensor 16 (configured at the gas outlet 5 of the fuel cell stack 2 and/or at the inlet to the humidifying device 6), which is formed for measuring the temperature of the exhaust gas $T_{exhaust\,gas}$ (humid). The temperature difference $\Delta T$ depicts a relative measurement for the humidity, especially the relative humidity of the exhaust gas flowing from the gas outlet 5. With optional uses of further magnitudes, as for example the cooling water inlet temperature $T_{KW}(in)$ of the temperature sensor 17, the cooling water outlet temperature $T_{KW}(out)$ of the sensor 18, the temperature of the supply gas $T_{OX}(in)$ in front of the humidifying device 6 at the sensor 3, or at the gas inlet 4 through the sensor $T_{OX}(out)$ 19 and/or pressure signals p through the system pressure sensor 20, the humidity (especially the relative humidity) of the supply gas at the gas inlet 4 can also be determined.

The humidity at the gas inlet 4 or gas outlet 5 is used as variable in a control circuit implementated in the controller 14. The control circuit accesses the throttling device 13 as control signal. With the help of the control circuit, it is possible to specifically adjust the humidity level within the fuel cell stack 2 via the throttling device 13 by means of a control signal.

The controller 14 is optionally also used as a warning device, wherein a warning signal is passed to a warning device 21 when predefined humidity limits of the supply gas or the exhaust gas are exceeded or undercut.

Figure 2:
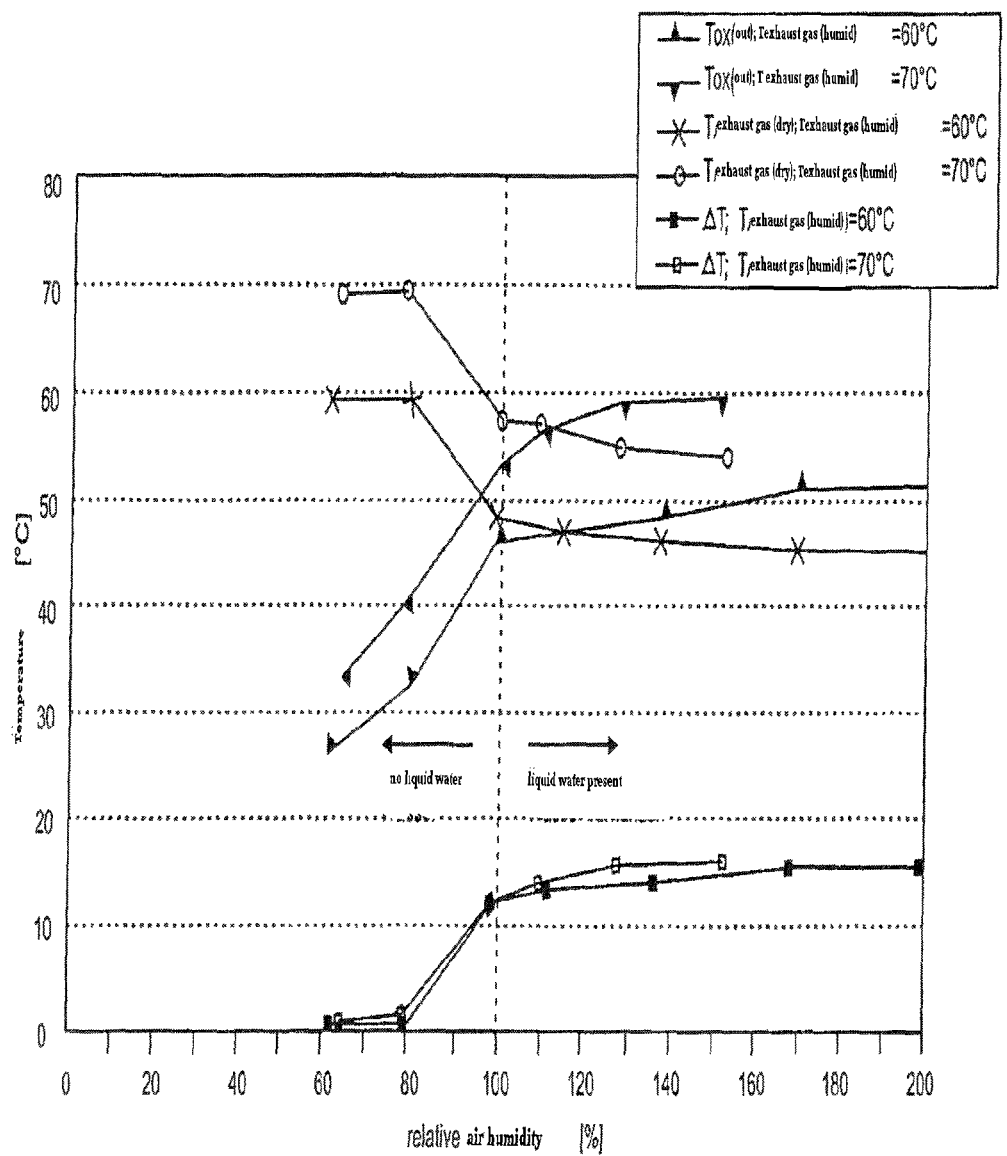
FIG. 2 is a measurement diagram for illustrating the operating mode of the invention.

FIG. 2 illustrates the relationship between the temperature difference between the exhaust gas and the dehumidified exhaust gas, and the relative humidity of the supply gas (f (relative humidity, ΔT)).

As can clearly be seen from the curve progression of the graphs ΔT, the temperature difference below a relative humidity of 80% is 0, and above an air humidity of 100% a constant value. This means that the temperature difference is a significant relative measurement for the relative air humidity of the exhaust gas between a relative humidity between 80% and 100%.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A system for a fuel cell stack comprising:
    a humidifying device configured to adjustably humidify a fuel cell stack supply gas based on a control signal;
    a dehumidifying device configured to dehumidify an exhaust gas that is formed from the supply gas conducted through the fuel cell stack, and to discharge the supply gas conducted through the fuel cell stack as a dehumidified exhaust gas; and
    a controller configured to generate the control signal based on a gas temperature of the dehumidified exhaust gas.

2. The system according to claim 1, wherein the controller is configured to generate the control signal based on a temperature difference between the exhaust gas and the dehumidified exhaust gas.

3. The system according to claim 1, wherein the controller is configured to generate the control signal based on the gas temperature of the dehumidified exhaust gas and at least one of fuel cell stack temperature, pressure, released fuel cell stack current, and air stoichiometry.

4. The system according to claim 1, wherein the humidifying device and the dehumidifying device are a part of a gas-to-gas humidifier.

5. The system according to claim 1, wherein:
    the humidifying device has a bypass line with a valve device that are configured to adjust the humidity of the fuel cell stack supply gas based on the control signal.

6. The supply system according to claim 1, wherein the exhaust gas has a relative humidity between 80% and 100%.

7. The system according to claim 1, wherein the controller is configured so that a magnitude of the control signal is based on at least one of a gas temperature of the dehumidified exhaust gas, and a temperature difference between the exhaust gas and the dehumidified exhaust gas.

* * * * *